US005592580A

United States Patent [19]

Doherty et al.

[11] Patent Number: 5,592,580

[45] Date of Patent: Jan. 7, 1997

[54] SYSTEM FOR CONTROLLING ENERGY OUTPUT OF COMBUSTION-POWERED, FASTENER-DRIVING TOOL

[75] Inventors: James E. Doherty, Barrington; Stanley C. Veoukas, Wheeling; Ernest J. Wendling, Algonquin, all of Ill.

[73] Assignee: Illinois Tool Works Inc., Glenview, Ill.

[21] Appl. No.: 337,289

[22] Filed: Nov. 10, 1994

[51] Int. Cl.$^6$ .......... H02P 5/00

[52] U.S. Cl. .......... 388/815; 388/937

[58] Field of Search .......... 388/806, 815, 388/821, 822, 902, 903, 930, 937; 361/23, 30, 33; 81/469, 57, 11, DIG. 12, 463; 173/2, 6, 176, 178, 181; 318/268, 66; 227/2, 7, 9, 38

[56] References Cited

U.S. PATENT DOCUMENTS

| | | | |
|---|---|---|---|
| 3,648,142 | 3/1972 | Corey et al. | 388/937 X |
| 4,483,474 | 11/1984 | Nikolich | 123/46 |
| 4,503,370 | 3/1985 | Cuneo | 388/937 X |
| 4,513,381 | 4/1985 | Houser, Jr. et al. | 388/903 X |
| 4,722,021 | 1/1988 | Hornung et al. | 361/49 |
| 4,806,832 | 2/1989 | Muller | 361/27 X |
| 4,851,743 | 7/1989 | Schmerda et al. | 388/811 |
| 5,440,215 | 8/1995 | Gilmore | 388/937 X |

*Primary Examiner*—Jonathan Wysocki

*Attorney, Agent, or Firm*—Schwartz & Weinrieb

[57] ABSTRACT

A system for controlling the energy output of a combustion-powered, fastener-driving tool in which a fan is arranged to produce turbulence in a combustion chamber when the fan is driven, in which a direct current motor is arranged to drive the fan when a driving voltage is applied across the motor, and in which a battery provides a battery voltage not less than the driving voltage. A voltage divider includes a settable resistance, either a potentiometer or two parallel, fixed resistances that can be alternatively selected, and is used to provide a setpoint voltage. A comparator, an inverter, and a transistor switch are arranged to sample a voltage proportional to the rotational speed of the fan, to compare the sampled voltage to the setpoint voltage, to apply the driving voltage across the motor if the sampled voltage is less than the setpoint voltage, and to remove the driving voltage from across the motor if the sampled voltage is not less than the setpoint voltage. The voltage divider also includes a permanently grounded resistance, two selectively groundable resistances, and two photoelectric switches, each including a phototransmissive diode and a photoreceptive transistor and being arranged to ground one of the selectively groundable resistances if a fastener between the phototransmissive diode and the photoreceptive transistor blocks phototransmission therebetween but not if the fastener does not block phototransmission therebetween. The photoelectric switches can thus be used for discriminating among relatively short, intermediate-length, and relatively long fasteners.

20 Claims, 2 Drawing Sheets

SYSTEM FOR CONTROLLING ENERGY OUTPUT OF COMBUSTION-POWERED, FASTENER-DRIVING TOOL

TECHNICAL FIELD OF THE INVENTION

This invention pertains to a system for controlling the energy output of a combustion-powered, fastener-driving tool, by controlling a fan, which is arranged to produce turbulence in a combustion chamber, and which is driven by a battery-powered, direct current motor.

BACKGROUND OF THE INVENTION

Combustion-powered, fastener-driving tools, such as combustion-powered, nail-driving tools and combustion-powered, staple-driving tools, are exemplified in Nikolich U.S. Pat. No. Re. 32,452, Nikolich U.S. Pat. No. 4,552,162, No. 4,483,474, and No. 4,403,722, and Wagdy U.S. Pat. No. 4,483,473.

Such a tool comprises a combustion chamber into which a combustible fuel is injected and in which the fuel is mixed with air and ignited. As disclosed in the Nikolich patents noted above, a fan or impeller is employed to produce turbulence of the fuel-air mixture in the combustion chamber of such a tool.

An ignition system for such a tool is disclosed in Rodseth et al. U.S. Pat. No. 5,133,329. The ignition system disclosed therein is battery-powered. A fuel system for such a tool is dislosed in Doherty et al. U.S. Pat. No. 5,263,439.

SUMMARY OF THE INVENTION

This invention provides a system for controlling the energy output of a combustion-powered, fastener-driving tool which comprises a combustion chamber and which exhibits a predetermined or characteristic energy output. Broadly, the system comprises a fan arranged to produce turbulence in the combustion chamber when the fan is driven, means for rotating the fan, and means for controlling the energy output of the tool. The controlling means controls the energy output of the tool by controlling the rotational speed of the fan.

The controlling means may comprise a voltage divider for providing a setpoint voltage, and a comparator for sampling a voltage proportional to the rotational speed of the fan, comparing the sampled voltage to the setpoint voltage, applying a voltage proportional to the battery voltage to the driving means if the sampled voltage is less than the setpoint voltage, and removing the applied voltage if the sampled voltage is not less than the setpoint voltage. The voltage divider may comprise a user-variable resistance.

Generally, the system may combine three known elements of such a tool, namely a fan arranged to produce turbulence in the combustion chamber when the fan is driven, a direct current motor arranged to drive the fan when a driving voltage is applied across the motor, and a battery providing a battery voltage not less than the driving voltage, the components being disposed within with a circuit for controlling the energy output of the tool by controlling the fan speed.

In accordance with a first aspect of this invention, the circuit may comprise means including a voltage divider having a resistive device connected to the battery and settable at any of at least two resistances for providing a setpoint voltage, and means including a comparator for sampling a voltage proportional to the fan speed, comparing the sampled voltage to the setpoint voltage, applying the driving voltage across the motor if the sampled voltage is less than the setpoint voltage, and removing the driving voltage if the sampled voltage is not less than the setpoint voltage. The resistive device may be infinitely settable over a range of possible resistances or may be instead settable to one of a finite set of fixed resistances.

Preferably, the means including the comparator further includes a transistor connected between the battery and the motor. The transistor is arranged to be switched on if the sampled voltage is less than the setpoint voltage and to be switched off if the sampled voltage is not less than the setpoint voltage.

Preferably, the comparator is arranged to output a high voltage if the sampled voltage is less than the setpoint voltage and to output a low voltage if the sampled voltage is not less than the setpoint voltage. The transistor switch is arranged to be switched on if a high voltage is outputted by the comparator and to be switched off if a low voltage is outputted by the comparator.

Preferably, the means including the comparator and the transistor switch further includes an inverter connected between the comparator and the transistor switch such that a voltage proportional to the voltage outputted by the comparator is inputted to the inverter. The inverter is arranged to output a low voltage if a high voltage is outputted by the comparator and to output a high voltage if a low voltage is outputted by the comparator. The transistor is arranged to be switched on if a low voltage is outputted by the inverter and to be switched off if a high voltage is outputted by the inverter.

In accordance with a second aspect of this invention, the circuit may be similar except that the voltage divider includes permanently connected resistances and a selectively groundable resistance, and the circuit further comprises a photoelectric switch. The photoelectric switch includes a phototransmissive diode and a photoreceptive transistor. The photoelectric switch is arranged to connect the selectively connectable resistance into the voltage divider if phototransmission is not blocked between the phototransmissive diode and the photoreceptive transistor, but not to connect the resistance to the voltage divider if phototransmission is blocked therebetween. Preferably, two photoelectric switches are provided which are arranged to function similarly.

These and other objects, features, and advantages of this invention will be evident from the following description of two alternative embodiments of this invention with reference to the accompanying drawings in which like reference characters designate like or corresponding parts throughout the several views, and wherein:

DETAILED DESCRIPTION OF THE ILLUSTRATED EMBODIMENTS

Figure 1:
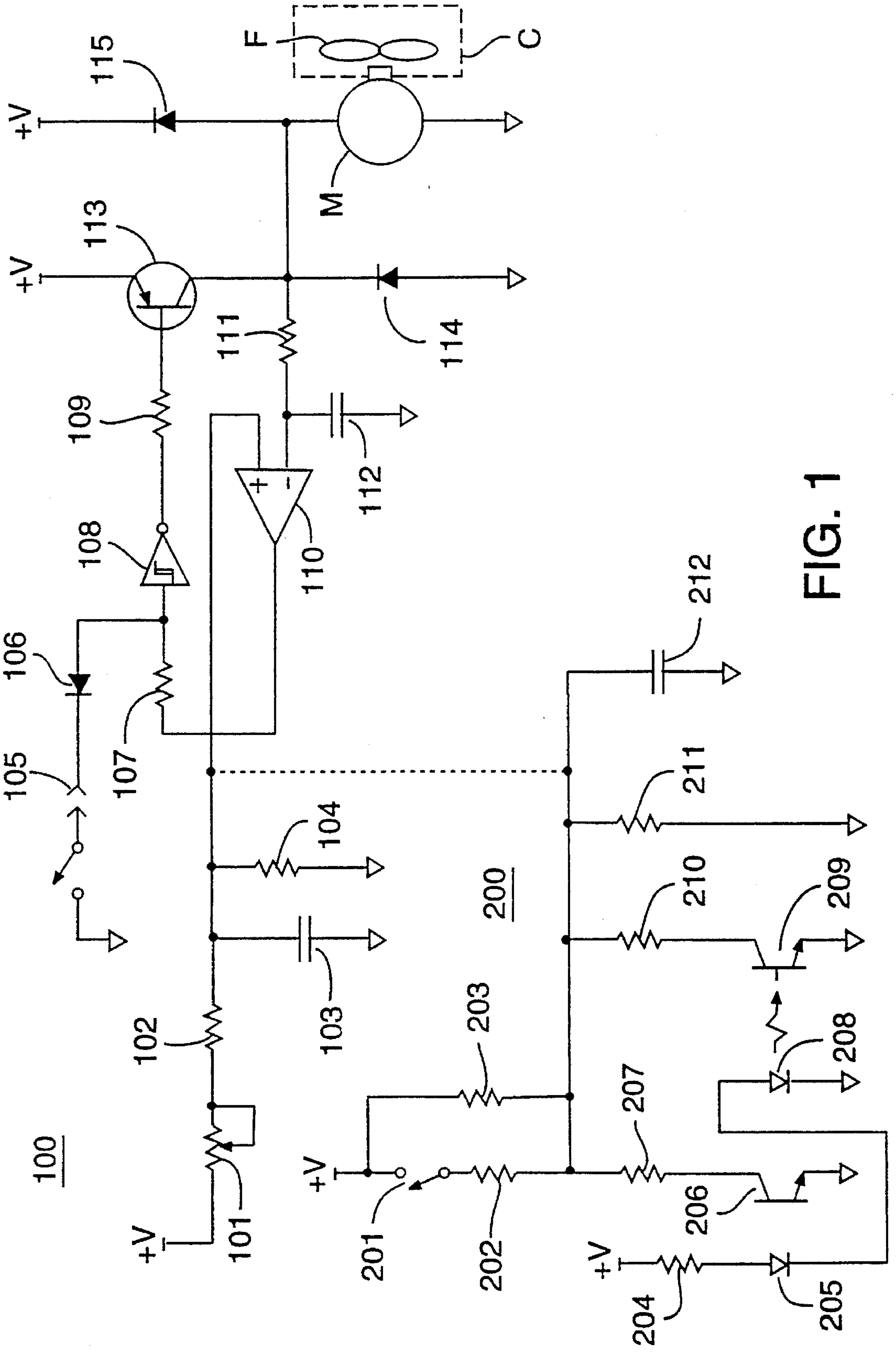
FIG. 1 is a circuit diagram of a system for controlling the energy output of a combustion-powered, fastener-driving tool which has a combustion chamber shown diagrammatically.

As shown in FIG. 1, a system provided by this invention controls the energy output of a combustion-powered, fastener-driving tool comprising a combustion chamber C and which constitutes one contemplated embodiment of this invention. Basically, the system controls the energy output by controlling the rotational speed of a fan F, which is arranged to produce turbulence in a fuel air-mixture in the combustion chamber C when the fan F is driven.

Figure 2:
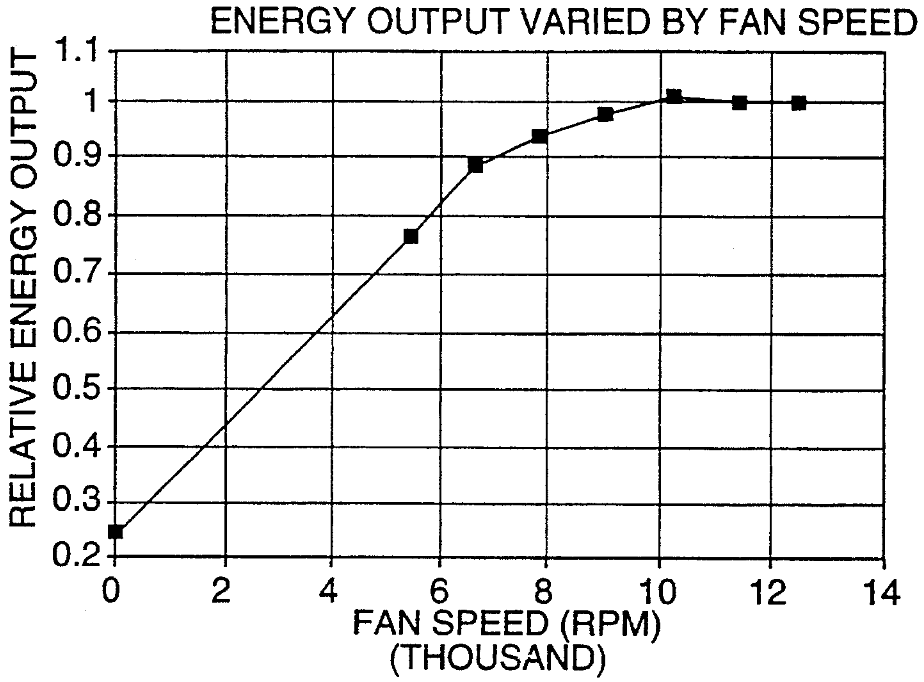
FIG. 2 is a graph of relative energy output versus fan speed as measured in a representative example of such a tool.

As shown in FIG. 2, higher rotational speeds of the fan F entail higher energy outputs of the tool 10, and lower rotational speeds of the fan F entail lower energy outputs of the tool 10. In some applications, as with relatively long fasteners being driven into relatively hard substrates, higher energy outputs are needed. In other applications, as with relatively short fasteners being driven into relatively soft substrates, lower energy outputs may suffice. Where lower energy outputs suffice, lower energy outputs are preferred over higher energy outputs, because lower energy outputs subject the tool 10 to less wear. Also, in many applications overdriving of fasteners can be avoided.

Except as illustrated in the drawings and described herein, the tool may be substantially similar to known tools exemplified in the Nikolich patents noted above (the disclosures of which are incorporated herein by reference) and available commercially from ITW Paslode (a unit of Illinois Tool Works Inc.) of Lincolnshire, Ill., under its IMPULSE trademark.

Besides the fan F, the system comprises a direct current motor M, which is arranged to drive the fan F when a driving voltage is applied across the motor M, a battery V providing a battery voltage (approximately 6.5 volts) not less than the driving voltage, and a circuit 100 to be next described for controlling the energy output of the tool by controlling the rotational speed of the fan F.

The circuit 100 comprises a voltage divider, which is connected to the positive terminal of the battery V and which is comprised of a potentiometer 101 (200 KΩ) arranged to be infinitely settable over a range of possible resistances, a resistor 102 (1 KΩ) connected to the potentiometer 101, a capacitor 103 (0.1 μF) grounding the resistor 102 to the negative terminal of the battery V, and a resistor 104 (100 KΩ) connected in parallel with the capacitor 103 and grounding the resistor 102 to the negative terminal of the battery V. The capacitor 103 functions as a noise filter.

The voltage divider is connected to the positive terminal of a comparator (operational amplifier) 110 so that the voltage divider provides a setpoint voltage for the comparator 110. The negative terminal of the comparator 110 is connected by means of a resistor 111 (100 KΩ) to the motor M so as to sample the motor voltage, which is proportional to the rotational speed of the fan F. The negative terminal of the comparator 110 is also connected to the negative terminal of the battery V by means of a capacitor 112 (0.1 μF) functioning to filter voltage spikes. The comparator 110 is arranged such that a high voltage is outputted by the comparator 110 if the sampled voltage of the motor M is less than the setpoint voltage and such that a low voltage is outputted by the comparator 110 if the sampled voltage of the motor M is not less than the setpoint voltage.

The comparator 110 is connected to a two-position switch 105 by means of a diode 106 (1N914) and a resistor 107 (100 KΩ) such that the output of the comparator 110 is conducted to the negative terminal of the battery V when the switch 105 is closed. Since the motor M cannot be energized if the switch 105 is closed, the switch 105 is deemed to be in a RUN condition when opened and in a STOP condition when closed.

The comparator 110 is also connected by means of the resistor 107 to an inverter (Schmitt trigger) 108 (74HC14) such that a voltage proportional to the voltage outputted by the comparator 110 is inputted to the inverter 108. The inverter 108 is arranged to output a low voltage if a high voltage is outputted by the comparator 110 and to output a high voltage if a low voltage is outputted by the comparator 110.

The inverter 108 is connected by means a resistor 109 (1 KΩ) to the base of a transistor (pnp) switch 113 (2N6727) such that a voltage proportional to the voltage outputted by the inverter 108 is inputted to the base of the transistor switch 113. The transistor switch 113 is arranged to be switched on when a low voltage is applied to its base and to be switched off when a high voltage is applied to its base. The emitter of the transistor switch 113 is connected to the positive terminal of the battery V. The collector of the transistor switch 113 is connected to the motor M. Thus, when the transistor switch 113 is switched on, the motor M is energized. When the switch 105 is closed, the transistor switch 113 is switched off, whereby the motor M is deenergized. So as to protect the transistor switch 113, a suppression diode 114 (1N4001) is connected between the motor M and the negative terminal of the battery V, and a suppression diode 115 (1N4001) is connected between the positive terminal of the battery V and the motor M.

As shown in FIG. 1, a circuit 200 comprises a voltage divider which can be alternatively used in place of the voltage divider comprised of the potentiometer 101, the resistor 102, the capacitor 103, and the resistor 104.

In the circuit 200, the voltage divider comprises a two-position switch 201 which when closed connects a resistor 202 (51 KΩ) to the positive terminal of the battery V. Also, the voltage divider comprises a resistor 203 (51 KΩ) which is also connected to the positive terminal of the battery V. Thus, when the switch 201 is closed, the resistor 202 is connected in parallel with the resistor 203. In a practical application, the switch is opened to condition the tool to drive a fastener into soft wood but closed to condition the tool to drive a fastener into hard wood, as indicated by legends in FIG. 2.

By means of a resistor 204 (120Ω), a phototransmissive diode 205 is connected to the positive terminal of the battery V. The phototransmissive diode 205 is arranged to coact with a photoreceptive transistor 206 which has its collector connected by means of a resistor 207 (200 KΩ) to the resistor 202 and to the resistor 203 and which has its emitter connected to the negative terminal of the battery V. The phototransmissive diode 205 and the photoreceptive transistor 206 constitute a photoelectric switch $S_1$ (GP2505).

Moreover, the phototransmissive diode 205 is connected to a phototransmissive diode 208 which is connected to the negative terminal of the battery V. The phototransmissive diode 208 is arranged to coact with a photoreceptive transistor 209 which has its collector connected by means of a resistor 210 (200 KΩ) to the resistors 202, 203, and 207 and which has its emitter connected to the negative terminal of the battery V. The phototransmissive diode 208 and the photoreceptive transistor 209 constitute a photoelectric switch $S_2$ (GP2505).

In the circuit 200, the voltage divider also comprises a resistor 211 (100 KΩ) connecting the resistors 202, 203, 207, and 210 to the negative terminal of the battery V and a capacitor 212 (0.1 μF) connected in parallel with the resistor 211. The capacitor 212 functions as a noise filter.

Figure 3:
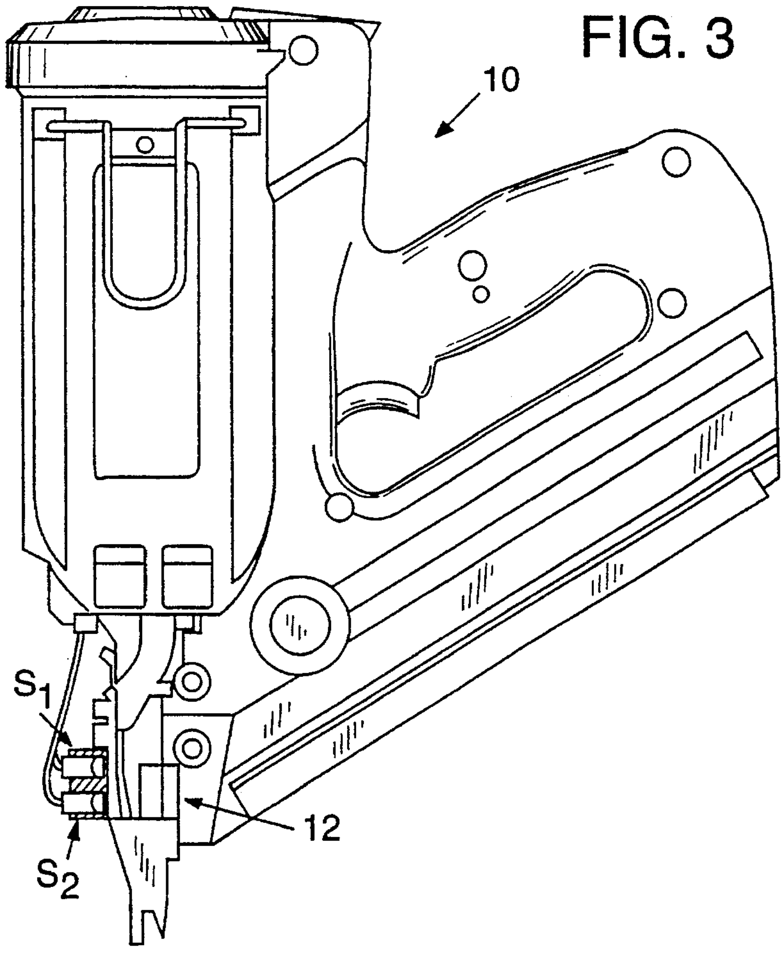
FIG. 3 is an elevational view of a combustion-powered, fastener-driving tool constituting one of the alternative embodiments of this invention.

Preferably, each of the photoelectric switches $S_1$, $S_2$, described hereinabove is a Sharp GP2505 Subminiature Photointerrupter with Lens. As shown in FIG. 3, the photoelectric switches $S_1$, $S_2$, can be suitably mounted in a combustion-powered, fastener-driving tool 10, as in the nosepiece 12 of the tool 10, such that each fastener to be driven by the tool 10 passes between the phototransmissive diode of each of the photoelectric switches $S_1$, $S_2$, and the photoreceptive transistor of each of the photoelectric switches $S_1$, $S_2$.

The photoelectric switch $S_1$ comprising the phototransmissive diode 205 and the photoreceptive transistor 206 can be arranged such that the photoreceptive transistor 206 is switched on when phototransmission between the phototransmissive diode 205 and the photoreceptive transistor 206 is not blocked, such that the photoreceptive transistor 206 is switched off when phototransmission between phototransmissive diode 205 and photoreceptive transistor 206 is blocked, and such that a relatively short fastener (for example, a fastener shorter than about 2.5 inches) does not block phototransmission between phototransmissive diode 205 and photoreceptive transistor 206 whereas a longer fastener blocks phototransmission between phototransmissive diode 205 and photoreceptive transistor 206.

The photoelectric switch $S_2$ comprising the phototransmissive diode 208 and the photoreceptive transistor 209 can be arranged such that the photoreceptive transistor 209 is switched on when phototransmission between the phototransmissive diode 208 and the photoreceptive transistor 209 is not blocked, such that the photoreceptive transistor 209 is switched off when phototransmission between phototransmissive diode 208 and photoreceptive transistor 209 is blocked, and such that a relatively short fastener (supra) or an intermediately long fastener does not block phototransmission between phototransmissive diode 208 and photoreceptive transistor 209 whereas a relatively long fastener (for example, a fastener longer than about 3.0 inches) blocks phototransmission between phototransmissive diode 208 and photoreceptive transistor 209.

In the circuit 200, the photoelectric switches can thus be arranged to condition the tool automatically to drive relatively short fasteners, intermediately long fasteners, or relatively long fasteners, after the switch 201 has been set to condition the tool for hard wood or soft wood.

Because this invention enables the energy output of a combustion-powered, fastener-driving tool to be precisely controlled for fasteners of different lengths and for different substrates, the tool may thus be subjected to less wear. Also, in many applications, overdriving of fasteners can thus be avoided.

Herein, all values and specifications stated parenthetically for the circuits 100, 200, are exemplary values, which are useful in the aforenoted embodiments of this invention. However, such values and specifications are not intended to limit this invention.

Various other modifications may be made in the preferred embodiment described above without departing from the scope and spirit of this invention. It is therefore to be understood that within the scope of the appended claims, the present invention may be practiced otherwise than as specifically described herein.

We claim:

1. In combination, a combustion-powered, fastener-driving tool exhibiting an energy output, and a system for controlling said energy output of said tool, comprising:

a combustion chamber defined within said combustion-powered, fastener-driving tool;

fan means disposed within said combustion chamber of said tool for producing turbulence within said combustion chamber of said tool when said fan means is driven;

motor means for driving said fan means when a driving voltage is applied across said motor means;

battery means for providing said driving voltage to said motor means; and circuit means, for controlling said energy output of said tool by controlling the speed of said fan means, comprising first means for providing a setpoint voltage, and second means, including a comparator, for sampling a voltage proportional to said speed of said fan means, comparing said sampled voltage to said setpoint voltage, and selectively applying said driving voltage across said motor means if said sampled voltage is less than said setpoint voltage and terminating said driving voltage to said motor means if said sampled voltage is not less than said setpoint voltage.

2. The combination of claim 1 wherein said second means including the comparator further includes a transistor connected between the battery and the motor and arranged to be switched on if the sampled voltage is less than the setpoint voltage and to be switched off if the sampled voltage is not less than the setpoint voltage.

3. The combination of claim 2 wherein the comparator is arranged to output a high voltage if the sampled voltage is less than the setpoint voltage and to output a low voltage if the sampled voltage is not less than the setpoint voltage and wherein the transistor is arranged to be switched on if a high voltage is outputted by the comparator and to be switched off if a low voltage is outputted by the comparator.

4. The combination of claim 3 wherein said second means including the comparator and the transistor further includes an inverter connected between the comparator and the transistor such that a voltage proportional to the voltage outputted by the comparator is inputted to the inverter, the inverter being arranged to output a low voltage if a high voltage is outputted by the comparator and to output a high voltage if a low voltage is outputted by the comparator, and wherein the transistor is arranged to be switched on if a low voltage is outputted by the inverter and to be switched off if a high voltage is outputted by the inverter.

5. The combination of claim 4 further comprising means including a switch, which is switchable between a RUN condition and a STOP condition, for permitting the voltage outputted by the comparator to be inputted to the inverter when the switch is switched to the RUN condition and for preventing the voltage outputted by the comparator to be inputted to the inverter when the switch is switched to the STOP condition.

6. The combination of claim 1, wherein:

said first means comprises a voltage divider having a resistive device which is arranged to be infinitely settable over a range of possible resistances.

7. The combination of claim 1, wherein:

said first means comprises a voltage divider having a resistive device which is settable to one of a finite set of fixed resistances.

8. The combination of claim 1, wherein:

said first means comprises a voltage divider which further includes permanently connected resistances and a selectively connectable resistance; and wherein said circuit means further comprises a photoelectric switch including a phototransmissive diode and a photoreceptive transistor which are arranged to connect said selectively connectable resistance to said voltage divider if phototransmission is not blocked between said phototransmissive diode and said photoreceptive transistor, but not to connect said selectively connectable resistance to said voltage divider if phototransmission is blocked between said phototransmissive diode and said photoreceptive transistor.

9. The combination of claim 1, wherein:

said first means comprises a voltage divider which further includes permanently connected resistances and two selectively connectable resistances; and wherein said circuit means further comprises two photoelectric switches, each one of said photoelectric switches including a phototransmissive diode and a photoreceptive transistor which are arranged to connect one of said selectively connectable resistances to said voltage divider if phototransmission is not blocked between said phototransmissive diode and said photoreceptive transistor, but not to connect said one of said selectively connectable resistances to said voltage divider if phototransmission is blocked between said phototransmissive diode and said photoreceptive transistor.

10. The combination as set forth in claim 1, wherein: said first means for providing said setpoint voltage comprises a voltage divider.

11. In combination, a combustion-powered, fastener-driving tool exhibiting an energy output, and a system for controlling said energy output of said tool, comprising:

a combustion chamber defined within said combustion-powered, fastener-driving tool;

fan means disposed within said combustion chamber of said tool for producing turbulence within said combustion chamber of said tool when said fan means is driven;

motor means for driving said fan means when a driving voltage is applied across said motor means;

battery means for providing said driving voltage to said motor means; and circuit means, for controlling said energy output of said tool by controlling the rotational speed of said fan means, comprising first means for providing a setpoint voltage, and second means, including a comparator, for sampling a voltage proportional to said rotational speed of said fan means, comparing said sampled voltage to said setpoint voltage, and selectively applying said driving voltage across said motor means if said sampled voltage is less than said setpoint voltage and terminating said driving voltage to said motor means if said sampled voltage is not less than said setpoint voltage, wherein said first means for providing said setpoint voltage comprises permanently connected resistances and a selectively connectable resistance, and said circuit means further comprises a photoelectric switch including a phototransmissive diode and a photoreceptive transistor which are arranged to connect said selectively connectable resistance to said first means for providing said setpoint voltage if phototransmission between said phototransmissive diode and said photoreceptive transistor is not blocked, but not to connect said selectively connectable resistance to said first means for providing said setpoint voltage if phototransmission between said phototransmissive diode and said photoreceptive transistor is blocked.

12. The combination of claim 11, wherein:

said first means for providing said setpoint voltage comprises a voltage divider which has a resistive device connected to said battery and which is settable at either of two resistances for providing said setpoint voltage.

13. The combination as set forth in claim 11, wherein:

said first means for providing said setpoint voltage comprises a voltage divider.

14. In combination, a combustion-powered, fastener-driving tool exhibiting an energy output, and a system for controlling said energy output of said tool, comprising:

a combustion chamber defined within said combustion-powered, fastener-driving tool;

fan means disposed within said combustion chamber of said tool for producing turbulence within said combustion chamber of said tool when said fan means is driven;

motor means for rotating said fan means when a driving voltage is applied across said motor means;

battery means for providing said driving voltage to said motor means; and circuit means, for controlling said energy output of said tool by controlling the rotational speed of said fan means, comprising first means for providing a setpoint voltage, and second means, including a comparator, for sampling a voltage proportional to said rotational speed of said fan means, comparing said sampled voltage to said setpoint voltage, and selectively applying said driving voltage across said motor means if said sampled voltage is less than said setpoint voltage and terminating said driving voltage to said motor means if said sampled voltage is not less than said setpoint voltage, wherein said first means comprises a selectively connectable resistance, and said circuit means further comprises a photoelectric switch including a phototransmissive diode and a photoreceptive transistor which are arranged to connect said selectively connectable resistance to said first means if phototransmission between said phototransmissive diode and said photoreceptive transistor is not blocked by a fastener to be driven by said tool, but not to connect said selectively connectable resistance to said first means if phototransmission between said phototransmissive diode and said photoreceptive transistor is blocked by a fastener to be driven by said tool whereby said tool can be used to drive fasteners having a predetermined length.

15. The combination as set forth in claim 14, wherein:

said first means comprises two selectively connectable resistances, and said circuit means further comprises two photoelectric switches wherein each one of said two photoelectric switches comprises a phototransmissive diode and a photoreceptive transistor which are arranged to connect one of said selectively connectable resistances to said first means if phototransmission between said phototransmissive diode and said photoreceptive transistor is not blocked by a fastener to be driven by said tool, but not to connect said one of said selectively connectable resistances to said first means if phototransmission between said phototransmissive diode and said photoreceptive transistor is blocked by a fastener to be driven by said tool whereby said tool can be used to drive fasteners having different predetermined lengths.

16. The combination as set forth in claim 14, wherein:

said tool has a nosepiece defined within a forward end portion thereof; and said photoelectric switch is disposed within said nosepiece of said tool.

17. The combination as set forth in claim 15, wherein:

said tool has a nosepiece defined within a forward end portion thereof; and said two photoelectric switches are disposed within said nosepiece of said tool.

18. The combination as set forth in claim 17, wherein:

a longitudinal axis is defined within said tool along which said fasteners are driven; and said two photoelectric switches are axially spaced within said nosepiece of said tool so as to permit said fasteners having said different predetermined lengths to be driven by said tool.

19. The combination as set forth in claim 12, wherein:

said first means for providing said setpoint voltage comprises a voltage divider.

20. The combination as set forth in claim 15, wherein:

said first means for providing said setpoint voltage comprises a voltage divider.

* * * * *